(12) United States Patent
Esser (10) Patent No.: US 6,953,127 B1
(45) Date of Patent: Oct. 11, 2005

(54) RAPID DEPLOY HAZMAT CONTAINMENT DEVICE

(75) Inventor: Richard A. Esser, Glenn Dale, MD (US)

(73) Assignee: TVI Corporation, Glenn Dale, MD (US)

( * ) Notice: Subject to any disclaimer, the term of this patent is extended or adjusted under 35 U.S.C. 154(b) by 133 days.

(21) Appl. No.: 09/689,615

(22) Filed: Oct. 13, 2000

Related U.S. Application Data

(60) Provisional application No. 60/159,507, filed on Oct. 15, 1999.

(51) Int. Cl.$^7$ ............................................. B65D 33/02
(52) U.S. Cl. ..................... 220/9.3; 220/9.4; 220/23.91; 220/495.01
(58) Field of Search .......................... 220/9.1, 9.2, 9.3, 220/9.4, 668, 23.91, 495.01, 23.86, 23.87, 220/495.07, 904, 495.06, 495.08; 248/95, 248/97, 99, 101

(56) References Cited

U.S. PATENT DOCUMENTS

| | | | | |
|---|---|---|---|---|
| 694,289 A | * | 2/1902 | Langston | 220/9.2 |
| 2,020,766 A | * | 11/1935 | Brown | 220/9.3 |
| 2,638,399 A | * | 5/1953 | Seymour | 220/9.3 |
| 3,633,932 A | * | 1/1972 | Holden | 220/9.3 |
| 4,473,986 A | | 10/1984 | Zeigler | 52/645 |
| 4,512,097 A | | 4/1985 | Zeigler | 40/611 |
| 4,522,008 A | | 6/1985 | Zeigler | 52/646 |
| 4,561,618 A | | 12/1985 | Zeigler | 248/166 |
| 4,579,066 A | | 4/1986 | Zeigler | 108/157 |
| 4,637,180 A | | 1/1987 | Zeigler | 52/109 |
| 4,689,932 A | | 9/1987 | Zeigler | 52/648 |
| 4,747,239 A | | 5/1988 | Zeigler | 52/109 |
| 4,761,929 A | | 8/1988 | Zeigler | 52/646 |
| 4,800,663 A | | 1/1989 | Zeigler | 40/610 |
| 4,838,003 A | | 6/1989 | Zeigler | 52/646 |
| 4,883,189 A | * | 11/1989 | Lobbert | 220/495.01 |
| 4,970,841 A | | 11/1990 | Zeigler | 52/646 |
| 4,989,749 A | * | 2/1991 | Choi | 220/9.4 |
| RE33,710 E | | 10/1991 | Zeigler | 52/648 |
| 5,230,196 A | | 7/1993 | Zeigler | 52/646 |
| 5,274,980 A | * | 1/1994 | Zeigler | 52/646 |
| 5,444,946 A | | 8/1995 | Zeigler | |
| 5,620,018 A | | 4/1997 | Carpenter et al. | |
| 5,651,228 A | | 7/1997 | Zeigler | 52/646 |
| 5,943,837 A | * | 8/1999 | Esser et al. | |
| 6,141,934 A | | 11/2000 | Zeigler | 52/646 |

* cited by examiner

*Primary Examiner*—Stephen Castellano
(74) *Attorney, Agent, or Firm*—Finnegan, Henderson, Farabow, Garrett & Dunner, L.L.P.

(57) ABSTRACT

A portable rapidly deploying hazardous material containment device is disclosed, which is adapted to receive and retain hazardous materials. The containment device includes a framework may be easily and rapidly manipulated between an erect open configuration and a collapsed compact configuration. The framework of the containment device includes rods, hubs, and a canopy. Each rod pivotally joins to another rod by a scissors-type connection intermediate the rod ends. In addition, the end portion of each rod pivotally joins to a hub, where each hub may receive a plurality of rods. As configured, each rod enjoys pivotal movement in relation to the hub along a single axis of revolution. The rods rotate about this single axis of revolution from the collapsed compact configuration, where the rods are substantially parallel to one another, to the erect open configuration, where the rods radiate outwardly from one another and the framework of the containment device includes four side walls. In this erect configuration, the containment device provides a frame for the canopy to reside and form a receptacle region for receiving and retaining hazardous materials.

18 Claims, 9 Drawing Sheets

RAPID DEPLOY HAZMAT CONTAINMENT DEVICE

RELATED APPLICATIONS

This patent application claims priority to Provisional U.S. Patent Application Ser. No. 60/159,507, entitled "Rapid Deploy Hazmat Containment Device", filed on Oct. 15, 1999, which is incorporated herein by reference.

BACKGROUND OF THE INVENTION

1. Field of the Invention

The present invention generally concerns the design and operation of containment devices for hazardous materials. More specifically, the present invention is directed toward a portable rapidly deploying containment device for recovery and containment of hazardous materials.

2. Description of the Prior Art

Recovery and containment of hazardous substances is a continuing problem for industries that encounter spills, leaks, or other contaminated waste in their normal course of business. Indeed, the potential for a liquid chemical leak or spill exists wherever chemicals are used. Any industry handling potentially harmful material is subject to legal, economic and other consequences resulting from delayed, inadequate, or otherwise improper containment of hazardous chemical spills.

In the shipping industry alone, millions of dollars are spent rectifying situations involving hazardous chemical spills. For example, the trucking industry is continually faced with spills of fuel or other potentially hazardous chemicals. Because of government regulations, the costs involved in cleaning these spills range anywhere from a few hundred dollars to hundreds of thousands of dollars, depending upon the amount of hazardous material abandoned to the environment. Rapid and efficient containment of these chemical spills is, therefore, not only a legal requirements but also an economic necessity. The concerns presented by hazardous chemical spills have created a specific need, at least in the shipping industry, for rapid and complete recovery of hazardous chemical spills.

Although there presently exist devices for containing hazardous spills in the shipping industry, the procedures and configurations of these devices are cumbersome and complex to manipulate and, therefore, impractical for immediate use. For example, many conventional containment devices are labor intensive and can require one or more workers specially trained in recovery of hazardous material to be available for deployment of the containment device. As such, these devices fail to provide a rapid means for containing hazardous spills. Conventional devices have also failed to provide a practical portable device capable of rapidly deploying from a closed compact configuration to an open erect configuration. Because of these and other deficiencies, the devices currently available for containment of hazardous materials are impractical for rapid and efficient recovery and containment of hazardous chemical spills.

In view of the limitations and complexity of existing containment devices, a need has arisen for a hazardous containment device which is simple in its application as well as construction, and capable of easily and rapidly deploying from a closed compact configuration to an open erect configuration.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the invention comprises a portable rapidly deploying hazardous material containment device which may be easily adapted to receive and contain a hazardous material. The containment device includes a framework structure that is movable between an erect open prism configuration and a collapsed compact configuration. In the prism configuration, the containment device includes a base and four side walls. The hazardous material is received and contained by a canopy disposed within the side walls of the device. To permit rapid deployment, the framework of the containment device comprises rods, where each rod is pivotally joined to another rod by a scissors-type connection intermediate the ends of the rod; and hubs, where each hub receives an end portion of at least two rods along a separate axis of the hub, such that the rods are pivotally joined to the hubs and each rod pivots in relation to the hub along a single axis of rotation. The rods rotate about this single axis of revolution from the collapsed configuration, where the rods are substantially parallel to one another, to the open erect configuration.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate preferred embodiments of the invention and, together with the description, serve to explain the principles of the invention. In the drawings.

DESCRIPTION OF THE PREFERRED EMBODIMENT(S)

Reference will now be made in detail to the present preferred embodiment of the invention, an example of which is illustrated in the accompanying drawings. Wherever possible, the same reference numbers will be used throughout the drawings to refer to the same or like parts.

U.S. Pat. No. 5,943,837 and pending U.S. Application entitled "Inverted V-Shaped Display Framework," filed Sep. 20, 1999, are incorporated herein by reference. These references describe hubs, frames, and hub assemblies for quick erect devices.

In accordance with the invention, there is provided a portable rapidly deploying hazardous material containment device capable of receiving and containing a hazardous material. The containment device includes a frame that is movable between an erect open configuration and a collapsed compact configuration. In the erect configuration, the containment device includes a base and four side walls, with a canopy disposed within the walls. To facilitate rapid deployment, the containment device comprises rods, where each rod is pivotally joined to another rod by a scissors-type connection intermediate the ends of the rod; and hubs, where each hub receives an end portion of at least two rods along a separate axis of the hub, whereby the rods are pivotally joined to the hubs and each rod pivots in relation to the hub along a single axis of rotation. This configuration allows the rods to rotate about the single axis of rotation from the collapsed configuration, where the rods are substantially parallel to one another, to the erect open configuration. To adjust the vertical height of the containment device in the erect configuration, a fastening mechanism may be affixed between opposing hubs of the erect unit. Alternatively, to limit the vertical compression of the containment device in the erect configuration, a stop mechanism may be affixed between opposing hubs of the erect unit.

As illustrated in the Figures, the containment device of the present invention is a complete integrated, modular structure, which is rugged, compact, and flexible in design. The containment device includes a frame that is designed for rapid setup as well as rapid breakdown. The device includes an exterior canopy that is preferably preattached to the articulate frame which expands to a vertical prism shape when erected. The containment device is self-supporting, which eliminates the need for supplementary erection devices, such as push poles and supplementary support devices, such as center poles.

The self-supporting nature of the containment device is derived from its articulate frame. The articulate frame consists of a plurality of rods or struts interconnected to hubs by pivotal joints. Each hub, which may interconnect with as many as four rods, includes an attachment mechanism which enables the exterior canopy to attach to a hub, depending upon whether the hub is located on the upper or lower portions of the articulate frame. Examples of such attachment mechanisms include clips, buttons, snaps, hook and loop fasteners, and adhesives. The structure of the containment device of the present invention is arranged such that the plurality of rods and hubs form a lattice framework. In the expanded configuration, this lattice framework forms a rectangular prism in which the canopy rests to form the basic receptacle for the containment device. In the collapsed configuration, the rods lay parallel to one another with groups of hubs disposed on both ends of the rods.

Figure 1:
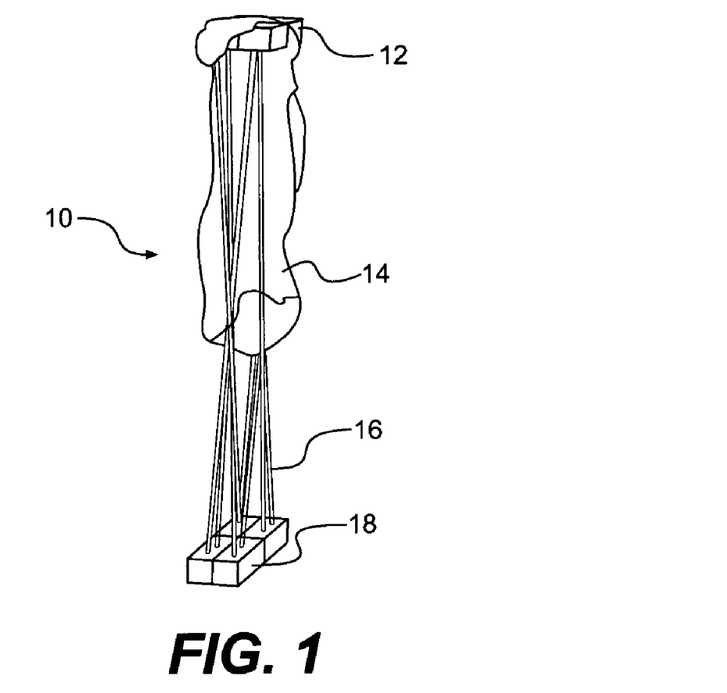
FIG. 1 is a perspective view illustration of an embodiment of a containment device in a closed compact configuration according to the present invention.
Figure 2:
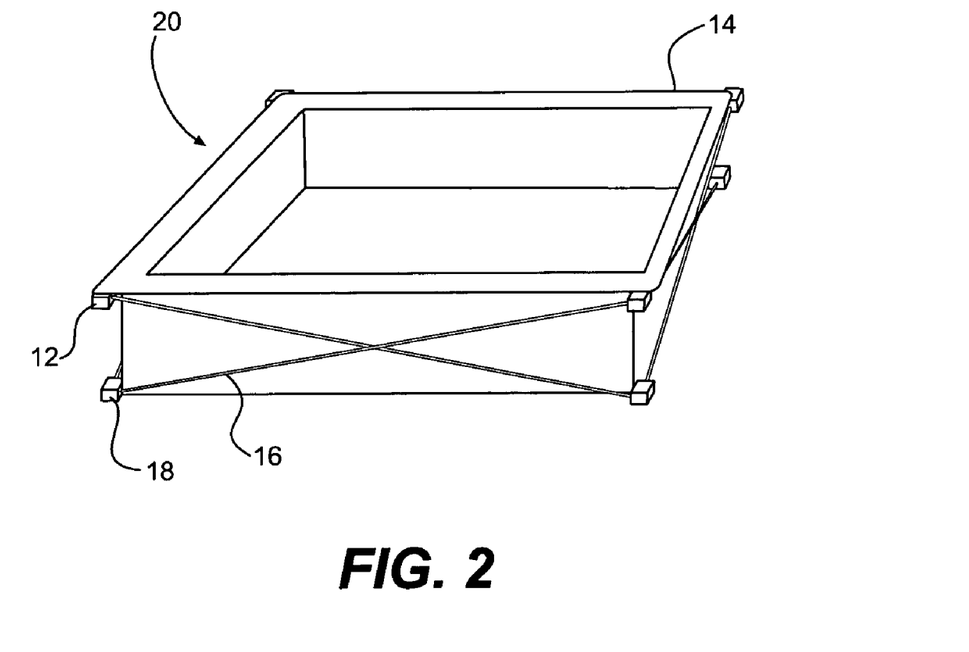
FIG. 2 is a perspective view illustration of an embodiment of a containment device in an open erect configuration according to the present invention.

The unique design of the frame of the containment device of the present invention allows the device to rapidly deploy from the closed compact configuration 10, depicted in FIG. 1, to the open erect prism shaped configuration 12, depicted in FIG. 2. In the closed configuration, the containment device easily compacts in size, because of the unique relationship between hubs 12, 18 and rods 16. For example, when deploying the containment device from the collapsed to expanded configuration, it opens similar to an accordian, where the user need only lower hubs 12 positioned at the upper portion of the framework downward toward the lower portion of the framework. This unique configuration further provides the containment device, while in its expanded configuration, with enhanced rigidity through post-tensioning of hubs 12, 18 and rods 16.

In the compact configuration, the containment device provides the shipping industry with a unit that may be easily stored and transported. In the erect configuration, the framework of the containment device provides a durable lightweight receptacle, defined by the dimensions of the erected four side walls, where each wall is formed by the scissors-type connection between respective rods 16. Residing within these walls is canopy 14, which serves as the receptacle for hazardous materials. Because canopy 14 receives and retains hazardous chemicals, it is preferred that it be constructed of a chemically resistive fabric or material. Canopy 14 preferably attaches to at least those hubs 12 positioned at the upper face of the framework in the erect configuration. Although canopy 14 may permanently attach to these hubs 12, it is preferred that canopy 14 removably attach to hubs 12, by any conventional means, including, but not limited to clips, snaps, buttons, velcro, or adhesives.

The practical design of the containment device provides an easily deployable unit, which may be articulated to its erect configuration by a single individual, regardless of technical background. Once erected, the unit enjoys great mobility, because it is constructed of lightweight, durable materials, such as lightweight metals, plastics or composite materials. Indeed, a single individual may effectively transport and manipulate the unit at the spill site to best contain spills of hazardous materials (i.e. sliding the erect unit beneath a tanker or other similar equipment).

As illustrated in the Figures, various modifications can be made to the containment device of the present invention without departing from the scope and spirit of the invention. For example, as illustrated in FIGS. 3–10, the canopy section of the containment device permits a variety of modifications that increase the adaptability as well as the strength of the receptacle of the containment device.

Figure 3:
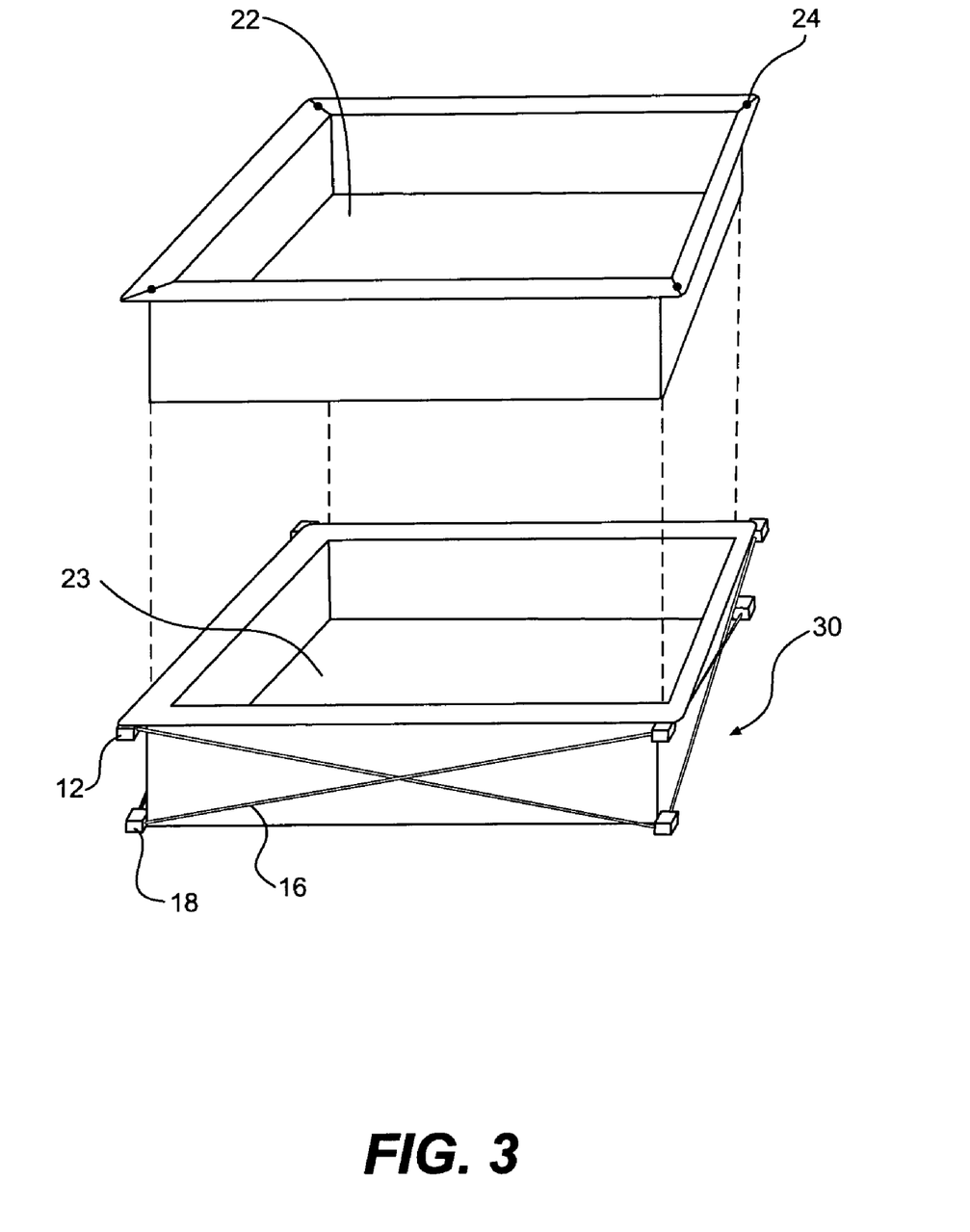
FIG. 3 is a perspective view illustration of an embodiment of a containment device showing a disposable liner and dead stop according to the present invention.
Figure 4:
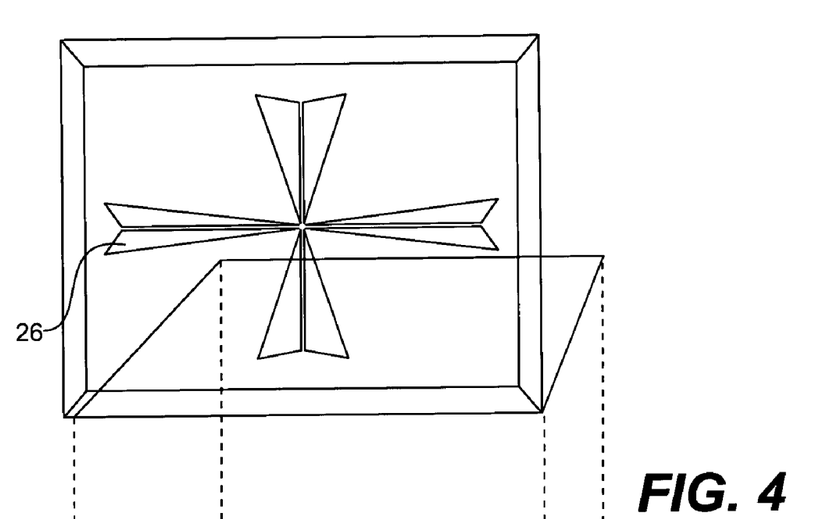
FIG. 4 is a top view illustration of an embodiment of a containment device showing a wedge shaped insert according to the present invention.
Figure 5:
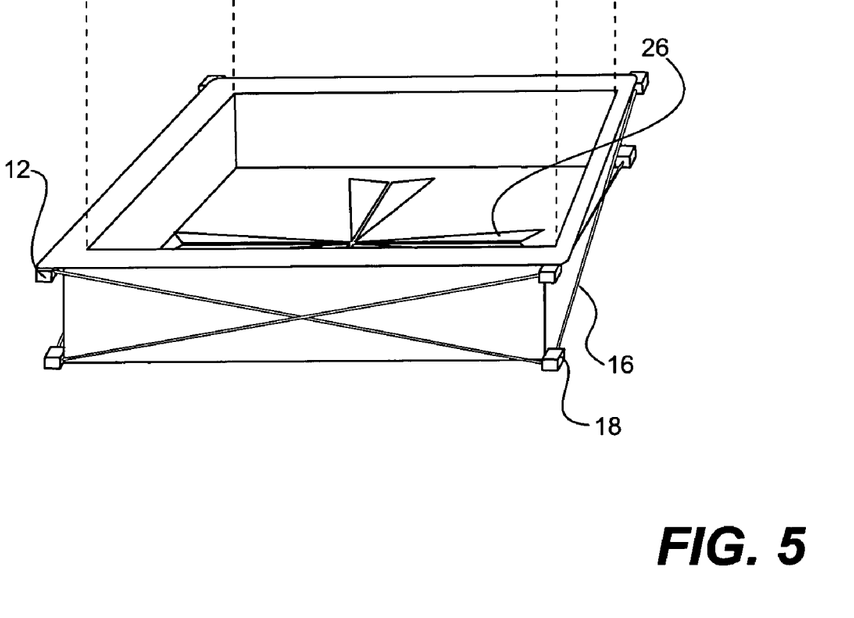
FIG. 5 is a perspective view illustration of an embodiment of the containment device showing a wedge shaped insert according to the present invention.
Figure 10:
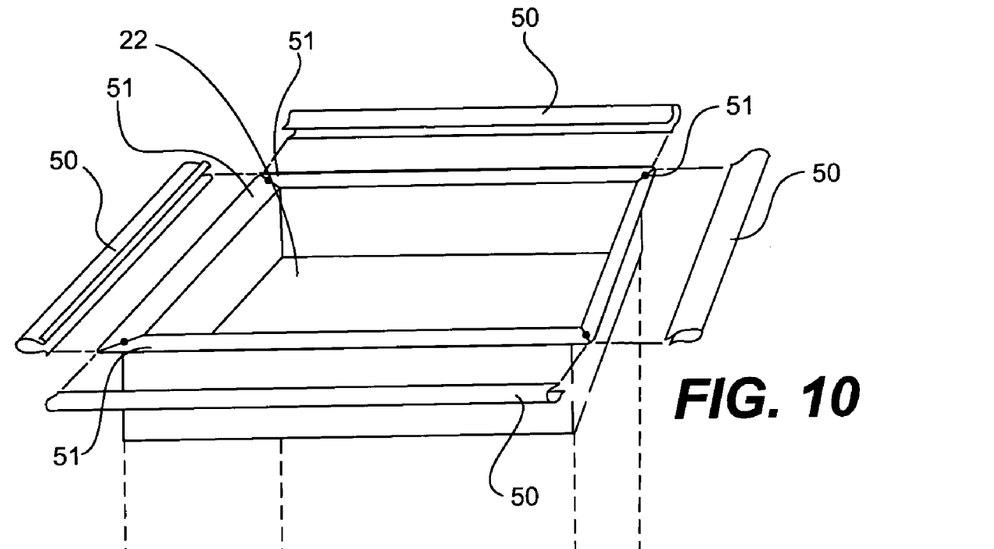
FIG. 10 is a perspective view illustration of an embodiment of a containment device showing hard fastening clips according to the present invention.

As illustrated in FIGS. 3–5, the containment device may enjoy increased adaptability and strength in its expanded configuration by affixing various support structures into the receptacle region formed by the rectangular prism. For example, as illustrated in FIG. 3, liner 22, preferably disposable, may be affixed into receptacle 23 to provide added strength as well as adaptability, because liner 22 may be easily removed and replaced. Liner 22 may be affixed to the containment device using various methods, including clips, buttons, snaps, hook and loop fasteners, or adhesives. To further strengthen the receiving capabilities of the containment device, wedge shaped insert 26 of preferably hard material may be attached to the bottom of canopy 14 to protect canopy 14 from heavy objects placed in the containment device. A preferred configuration of wedge shaped insert 26 is illustrated in FIGS. 4 and 5. For additional strength, the containment device may be used in conjunction with hard fastening clips 50 that adhere to the side walls of the containment device in the open erect configuration, as illustrated in FIG. 10. These clips 50 reinforce the connection between hubs 12, canopy 14, and liner 22.

Figure 6:
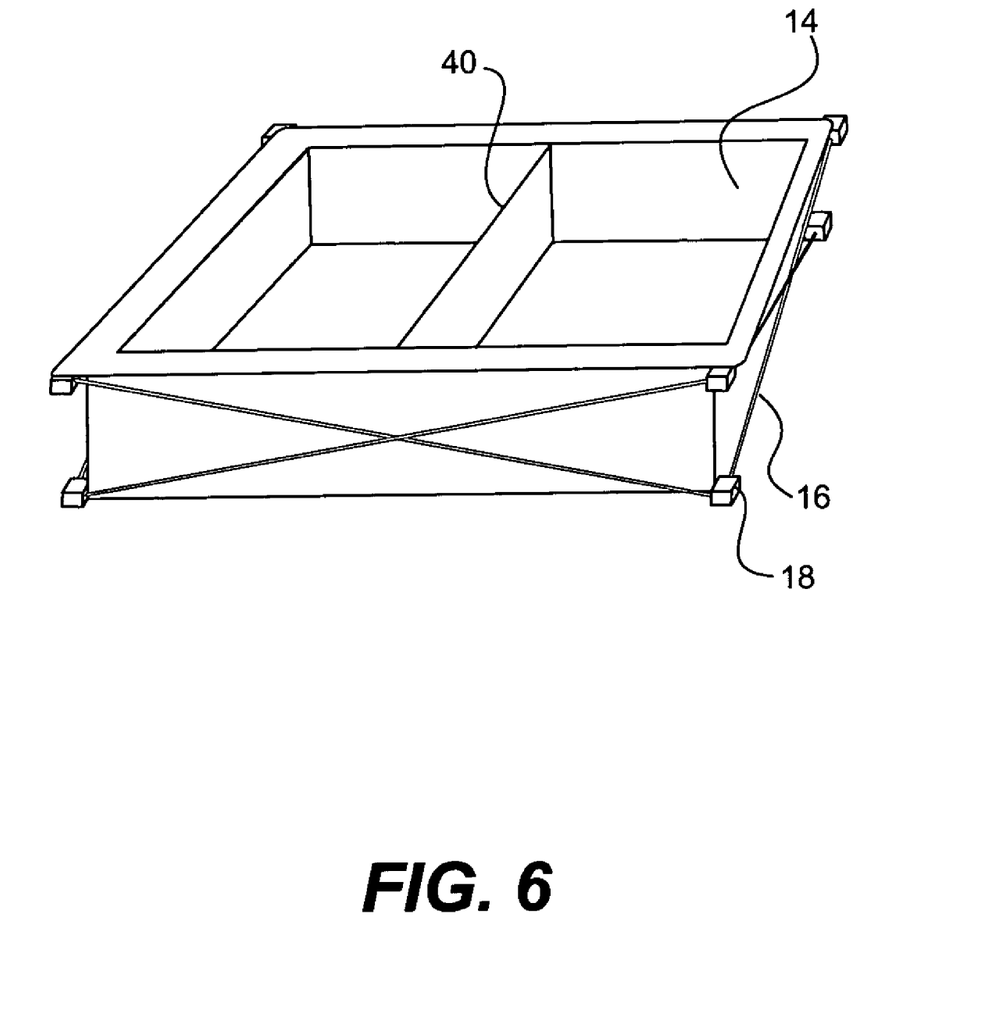
FIG. 6 is perspective view illustration of an embodiment of the containment device showing a compartmentalized receptacle according to the present invention.
Figure 7:
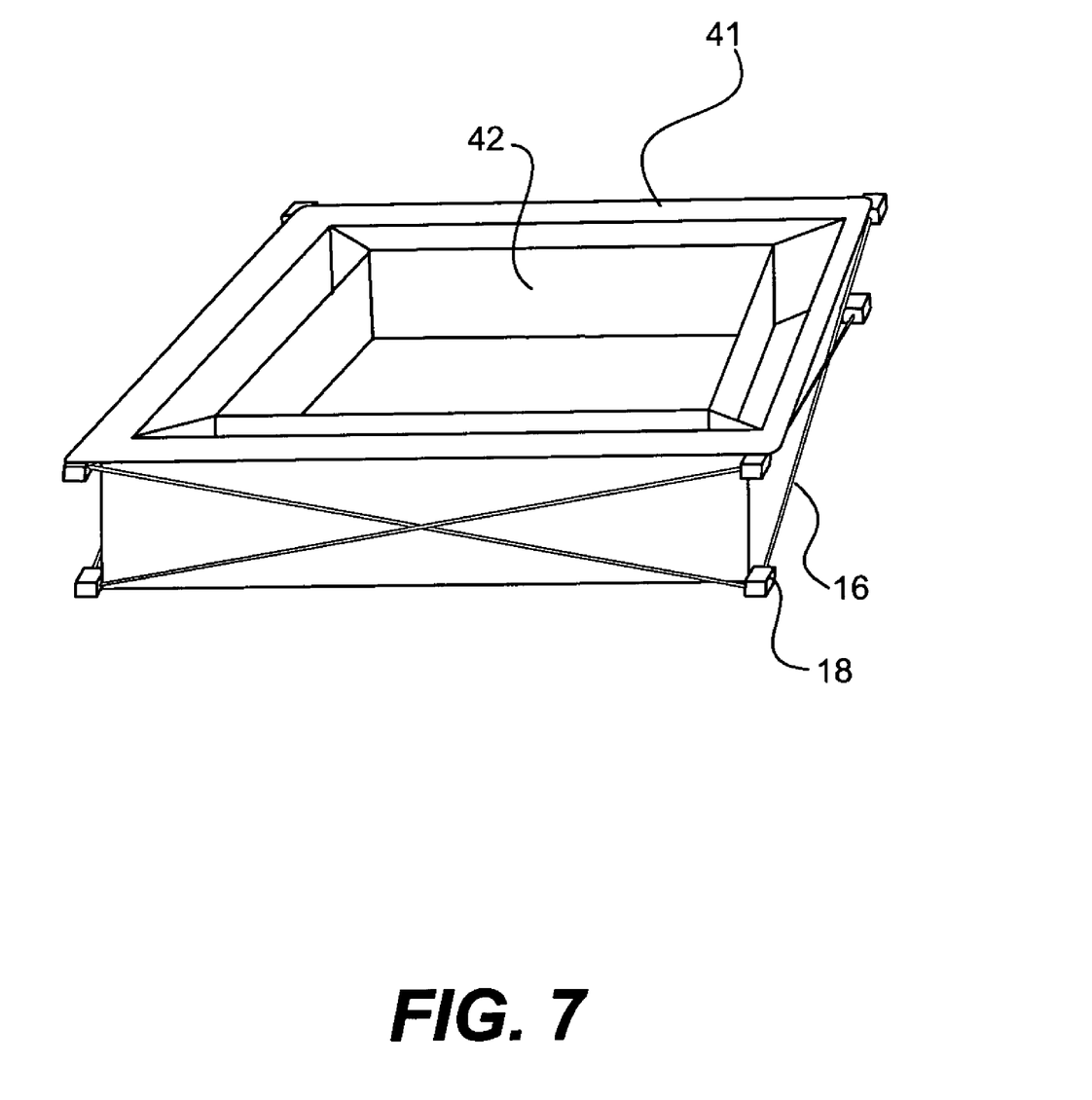
FIG. 7 is a perspective view illustration of an embodiment of a containment device showing inner and outer receptacles according to the present invention.
Figure 9:
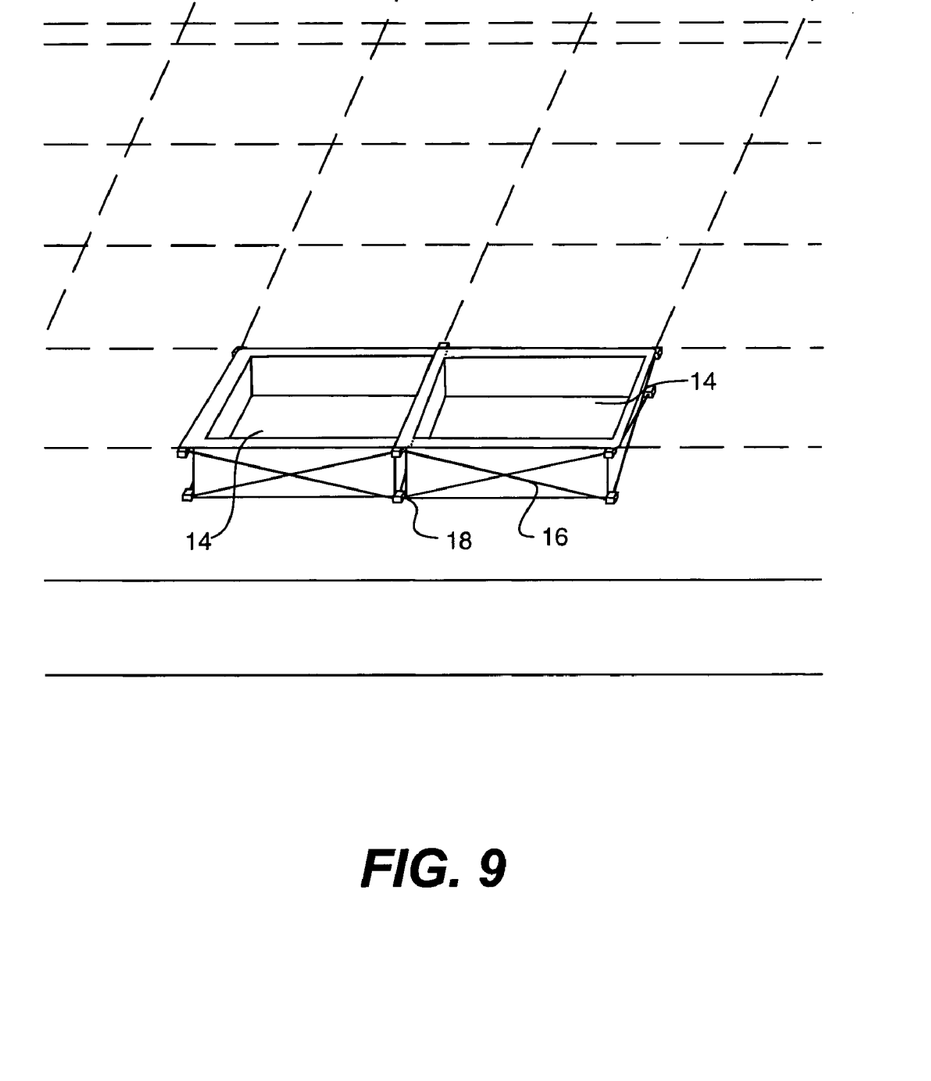
FIG. 9 is a perspective view illustration of an embodiment of a containment device showing two or more receptacles attached according to the present invention.
Figure 12:
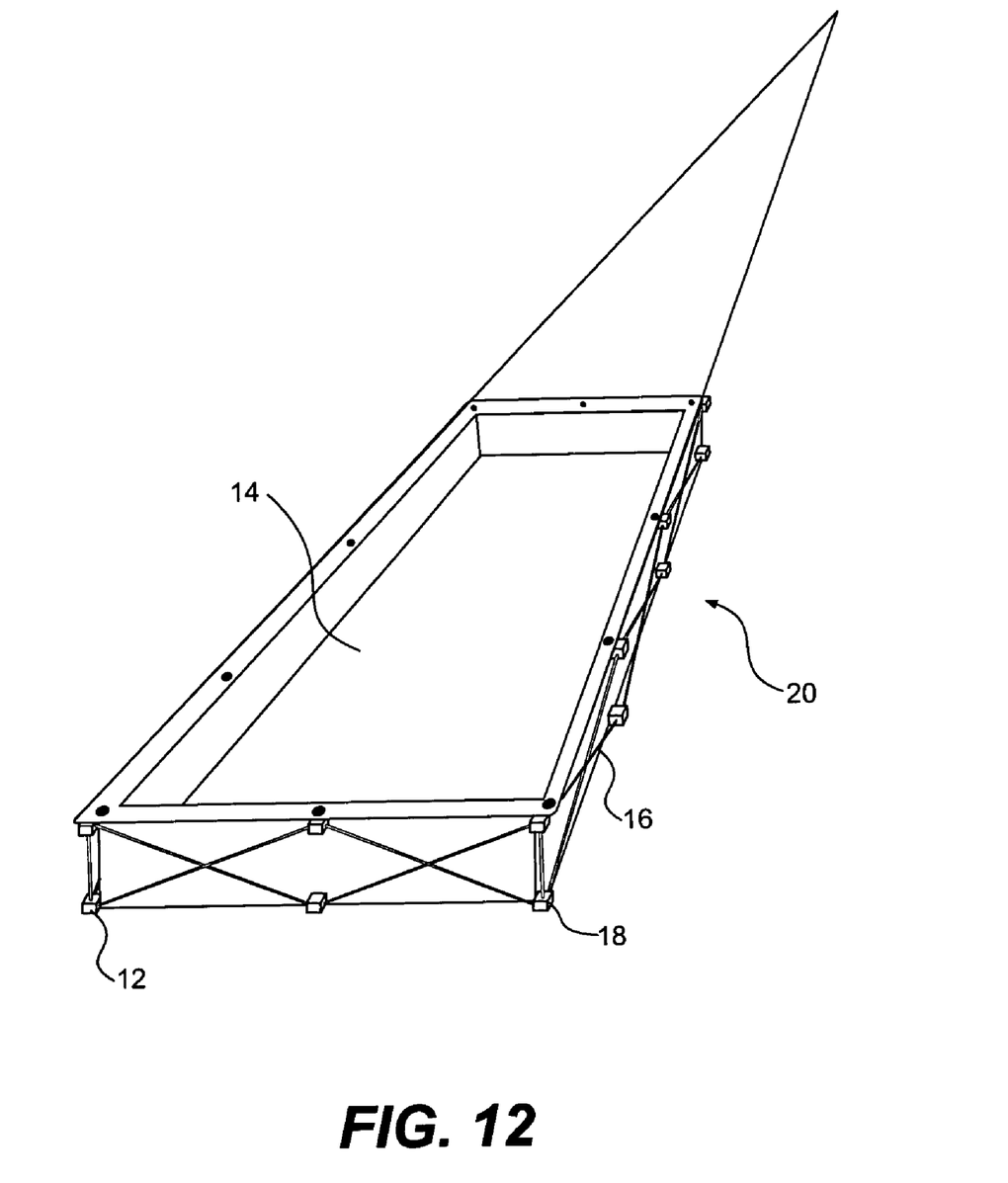
FIG. 12 is a perspective view illustration of an embodiment of a containment device showing two or more receptacles attached according to the present invention.

In addition to strengthening the canopy, the containment device may be partitioned to retain differing types of hazardous material. For example, as depicted in FIG. 6, the containment device may include receptacle 40 which is compartmentalized, such that when the containment device is deployed into its erect configuration there exists one or more receiving areas encompassed within the side walls of the unit. Furthermore, to offer increased safety in retention of hazardous materials, the receptacle may include one or more separate canopies. As designed, the containment device, in its open erect configuration, includes liner 41 and outer 42 compartments, each capable of receiving and retaining hazardous materials, as illustrated in FIG. 7. For spills of various materials or of greater proportion, the receiving capabilities of the containment device may be easily expanded by attaching one or more units adjacent one another, preferably joined at the hub sections, as illustrated in FIGS. 9 and 12. Similarly, the rods may include a telescoping member that permits extension in the length of the rods, thereby, increasing the receiving volume of the receptacle region.

Figure 8:
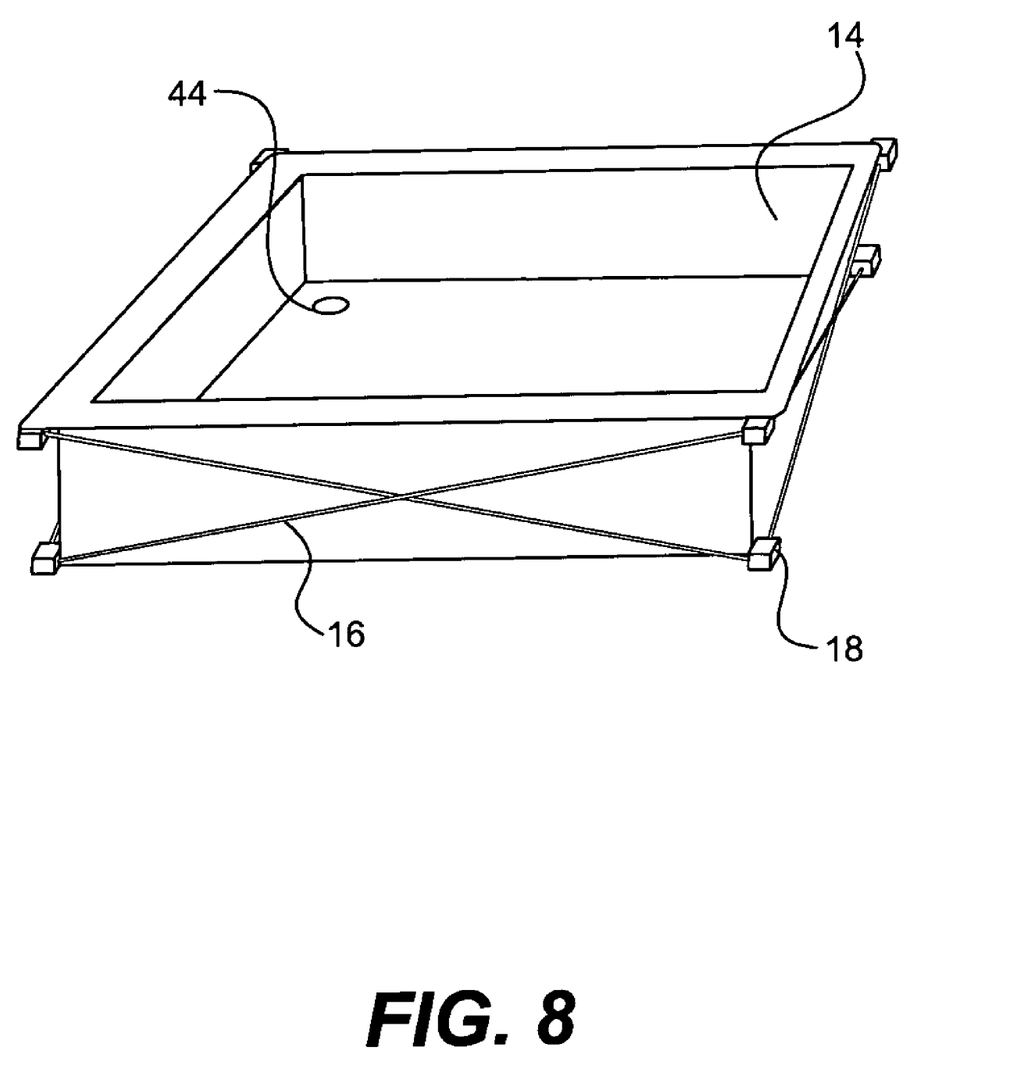
FIG. 8 is a perspective view illustration of an embodiment of a containment device showing a drain outlet according to the present invention.

Regardless of the particular canopy configuration, hazardous material resident in the receptacle may be easily removed by a conduit or other conveying means attached to one or more outlets 44 or drain holes of canopy 14, as illustrated in FIG. 8. Such removal capabilities increases the capacity of the containment device, because it permits draining of the receptacle region while simultaneously allowing the receptacle region to continue to receive hazardous materials.

Figure 11:
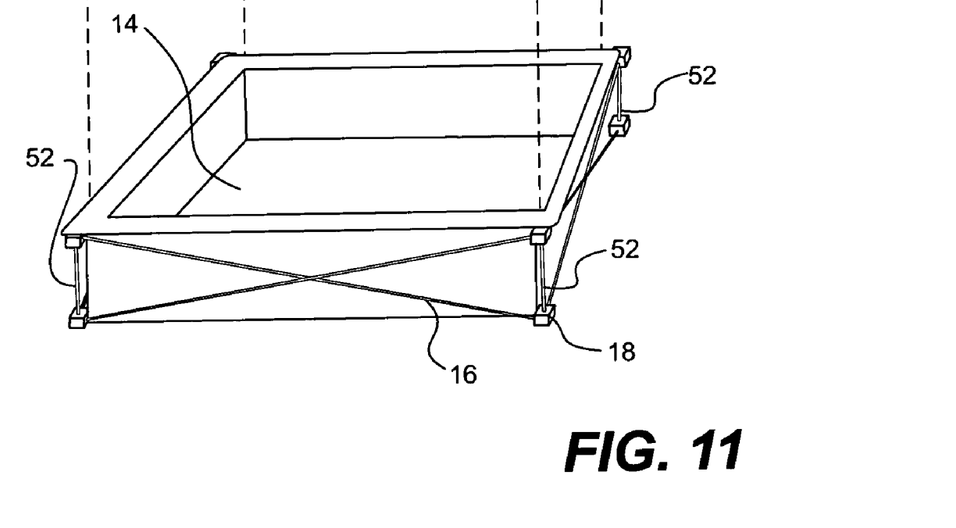
FIG. 11 is a perspective view illustration of an embodiment of a containment device showing height adjustable straps according to the present invention.

The adaptability of the containment device may be further manipulated by controlling the vertical dimensions of the unit once erected. For example, to adjust the height of the erect containment device, adjustable straps 52, as depicted in FIG. 11, may be affixed to opposing hubs 12, 18 of the device. These straps 52 may include a becket latch or other fastening system that allows the user to adjust the height of one or more corners of the containment device by adjusting the length of each strap 52. Alternatively, to control the height of the erect unit, dead stop 30 may be placed between opposing hubs 12, 18 of the containment device, as illustrated in FIG. 3. In essence, dead stop 30 prevents the corners of the containment device from compacting in its vertical height beyond a predetermined distance.

It will be apparent to those skilled in the art that additional modifications and variations can be made in the containment device of the present invention and in construction of this device without departing from the scope or spirit of the invention. Further, use of the containment device is not limited to the shipping industry, as it may be used in any situation involving the receipt and retention of hazardous materials (i.e. decontamination showers for individuals and contaminated waste).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A rapid deploy containment device adapted to receive and retain hazardous waste, the containment device being convertible between an erect open configuration and a collapsed compact configuration, the containment device in the erect open configuration forming a receptacle region, the containment device comprising:
   a plurality of rods, each rod comprising a first end, a second end, and an intermediate portion, wherein the intermediate portion of each rod is pivotably connected to the intermediate portion of another rod;
   a plurality of first hubs, each first hub receiving first ends of at least two respective rods, wherein each respective rod is pivotable with respect to the first hub about a distinct axis; and
   a plurality of second hubs configured to engage a support surface, each second hub receiving second ends of at least two respective rods, wherein each respective rod is pivotable with respect to the second hub about a distinct axis; and
   a receptacle comprising a plurality of attachment portions secured to respective first hubs, wherein the receptacle collapses when the frame is in the closed configuration and the receptacle forms a containment volume in the central space when the frame is in the open configuration.

2. The containment device recited in claim 1, wherein each of said hubs includes flanges, where at least two of the flanges receive the end portion of said rods.

3. The containment device recited in claim 2, wherein the end portion of each of said rods is pivotally joined to one of said flanges by a pin inserted through the end portion of said rod and received on said flange.

4. The containment device recited in claim 2, wherein the at least two flanges lay substantially perpendicular to one another, whereby each of said hubs receives rods along a first axis and a second axis perpendicular to the first axis.

5. The containment device recited in claim 4, wherein the ends of said substantially perpendicular flanges bend at right angles in either a clockwise or counterclockwise direction.

6. The containment device recited in claim 5, wherein the end portion of each of said rods is pivotally joined to a hub by a pin inserted through the end portion of said rod and received on two opposing flanges.

7. The containment device recited in claim 2, wherein said hub includes a base portion, where the at least two flanges project from said base portion.

8. The containment device recited in claim 1, wherein each of said hubs includes a base portion, the end portion of each of said rods being pivotally joined to said base portion by a pin inserted through the end portion of said rods and received on said base portion.

9. The containment device recited in claim 1, wherein each rod is of substantially equal length and wherein said scissor connection is proximate the middle of each rod.

10. The containment device recited in claim 1, further comprising a liner positioned in the receptacle region adjacent said canopy, said liner being made of a material resistive to hazardous chemicals.

11. The containment device recited in claim 1, wherein the canopy is made of a material resistive to hazardous chemicals.

12. A rapid deploy containment device adapted to receive and retain hazardous waste, the containment device being convertible between an erect open configuration and a collapsed compact configuration, the containment device comprising:
   rods, each rod being pivotally joined to another rod by a scissors connection intermediate the ends of said rod;
   hubs, each hub receiving an end portion of at least two rods along separate axes of each hub, the end portion being pivotally joined to said hub, where the end portion pivots in relation to said hub along a single axis of revolution,
   each end portion being rotatable about its axis of revolution from the collapsed compact configuration, where all of said rods are substantially parallel to one another and where said hubs are positioned adjacent one another at each end portion of the collapsed compact configuration, to the open erect configuration, wherein the hubs positioned proximate a top portion of the collapsed compact configuration descend downward toward a bottom portion of the containment device when converting from the collapsed compact configuration to the erect open configuration and wherein the containment device articulates between the collapsed compact configuration and the erect open configuration in height, length, and width; and
   a canopy affixed to at least two hubs proximate the top portion of the containment device in the open erect configuration to form the receptacle region capable of receiving and retaining hazardous chemicals.

13. A portable containment device comprising:
   a frame movable between a closed configuration, in which the frame delimits a negligible area, and an open configuration, in which the frame forms a plurality of walls defining a central space, wherein the frame comprises:
   a plurality of rods, each rod comprising a first end, a second end, and an intermediate portion, wherein the intermediate portion of each rod is pivotably connected to the intermediate portion of another rod;
   a plurality of first hubs, each first hub receiving first ends of at least two respective rods, wherein each respective rod is pivotable with respect to the first hub about a distinct axis; and
   a plurality of second hubs configured to engage a support surface, each second hub receiving second ends of at least two respective rods, wherein each respective rod is pivotable with respect to the second hub about a distinct axis; and
   a receptacle comprising a plurality of attachment portions secured to respective first hubs, wherein the receptacle collapses when the frame is in the closed configuration and the receptacle forms a containment volume in the central space when the frame is in the open configuration.

14. The device of claim 13, wherein the frame defines a length, a width, and a height and wherein the length, the width, and the height of the frame in the closed configuration are different from the length, the width, and the height of the frame in the open configuration.

15. The device of claim 14, wherein the length and the width of the frame in the closed configuration are less than the length and the width of the frame in the open configuration.

16. The device of claim 14, wherein the height of the frame in the closed configuration is greater than the height of the frame in the open configuration.

17. The device of claim 13, wherein at least one rod received by a first hub is pivotable about a first axis and wherein at least one other rod received by the first hub is pivotable about a second axis substantially perpendicular to the first axis.

18. The device of claim 13, wherein at least one rod received by a second hub is pivotable about a third axis and wherein at least one other rod received by the second hub is pivotable about a fourth axis substantially perpendicular to the third axis.

* * * * *

UNITED STATES PATENT AND TRADEMARK OFFICE
CERTIFICATE OF CORRECTION

PATENT NO. : 6,953,127 B1
DATED : October 11, 2005
INVENTOR(S) : Richard A. Esser et al.

It is certified that error appears in the above-identified patent and that said Letters Patent is hereby corrected as shown below:

Title page,
Item [76], Inventors, should read "Richard A. Esser, Glenn Dale, MD (US); Chad Sample, Glenn Dale, MD (US) --.

Column 6,
Beginning at line 17, Claim 1 should read:
    A rapid deploy containment device adapted to receive and retain hazardous waste, the containment device being convertible between an erect open configuration and a collapsed compact configuration, the containment device in the erect open configuration forming a receptacle region, the containment device comprising:
    rods, each rod being pivotally joined to another rod by a scissors connection intermediate the ends of said rod;
    hubs, each hub receiving an end portion of at least two rods along separate axes of each hub, the end portion being pivotally joined to said hub, where the end portion pivots in relation to said hub along a single axis of revolution, each end portion pivoting along separate axes of revolution in relation to said hub,
    each end portion being rotatable about its axis of revolution from the collapsed compact configuration, where all of said rods are substantially parallel to one another, to the erect open configuration, the containment device articulating along three axes, whereby the containment device changes between the compact and open configurations in height, length and width; and
    a canopy connected to at least two hubs and residing in the receptacle region of the erect open containment device.

Signed and Sealed this

Eighteenth Day of April, 2006

JON W. DUDAS
*Director of the United States Patent and Trademark Office*